J. J. PATTON.
TIRE.
APPLICATION FILED FEB. 14, 1913.

1,080,295.

Patented Dec. 2, 1913.
2 SHEETS—SHEET 1.

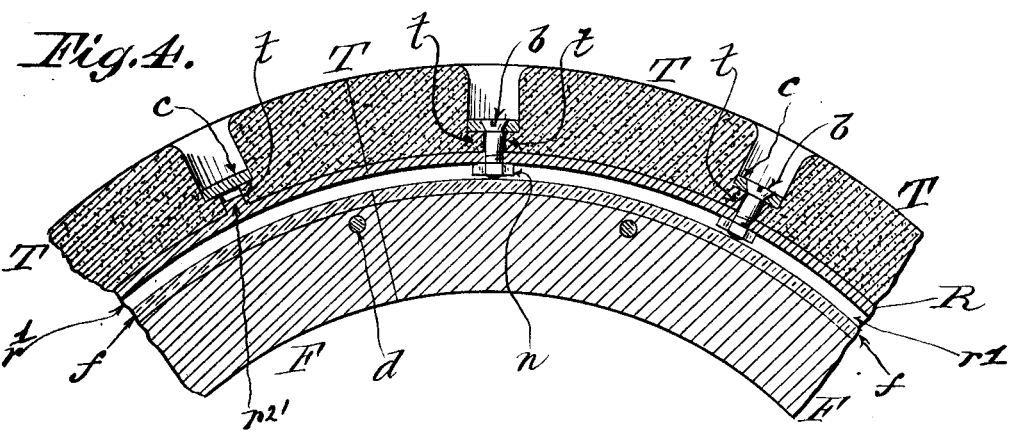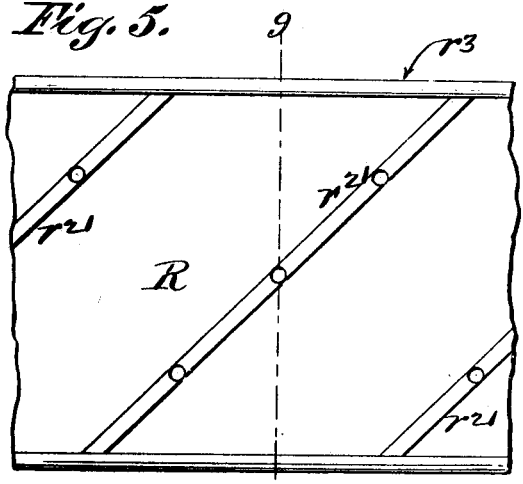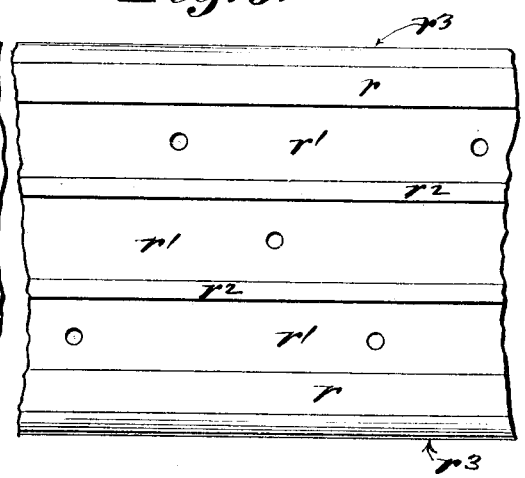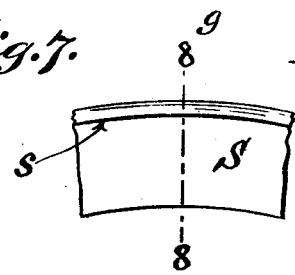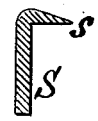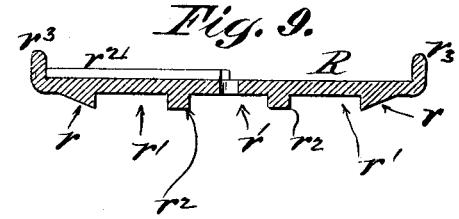

UNITED STATES PATENT OFFICE.

JOHN J. PATTON, OF NEW YORK, N. Y.

TIRE.

1,080,295.  Specification of Letters Patent.  Patented Dec. 2, 1913.

Application filed February 14, 1913. Serial No. 748,359.

*To all whom it may concern:*

Be it known that I, JOHN J. PATTON, a citizen of the United States, and a resident of the borough of Manhattan, city, county, and State of New York, have invented certain new and useful Improvements in Tires, of which the following is a specification.

My invention while applicable to wheel tires generally is especially adapted for use in connection with vehicles designed for heavy traction, such as automobiles and wagons employed in commercial transportation, provided with wheels having relatively broad tires and solid elastic resilient treads.

The main object of the invention is to afford simple but effective means whereby the tire may be quickly and conveniently applied to or removed from the wheel felly; and the invention consists in the specific construction and arrangement of parts herein described and claimed,—a distinctive feature being the use, in conjunction with a wheel having a permanent peripheral felly band, and with a detachable tire rim, of annular wedge-flange side plates adapted to detachably secure said tire rim to the said felly as hereinafter set forth.

Figure 1:
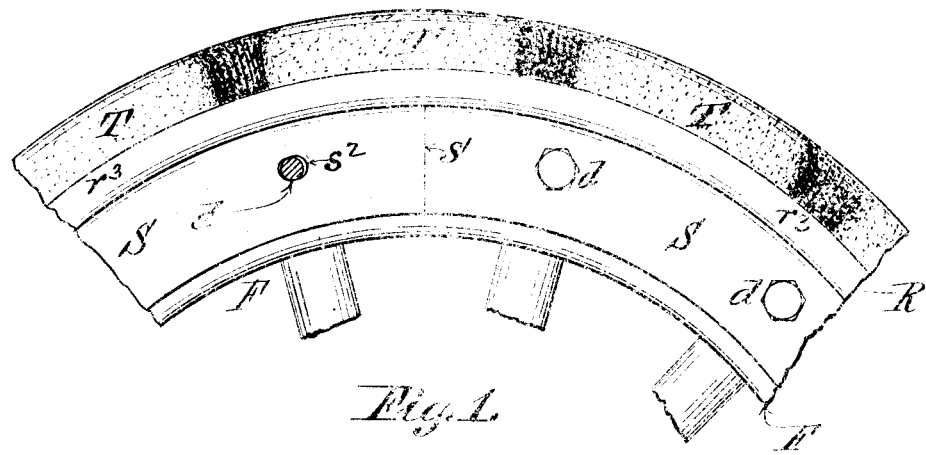
Figure 2:
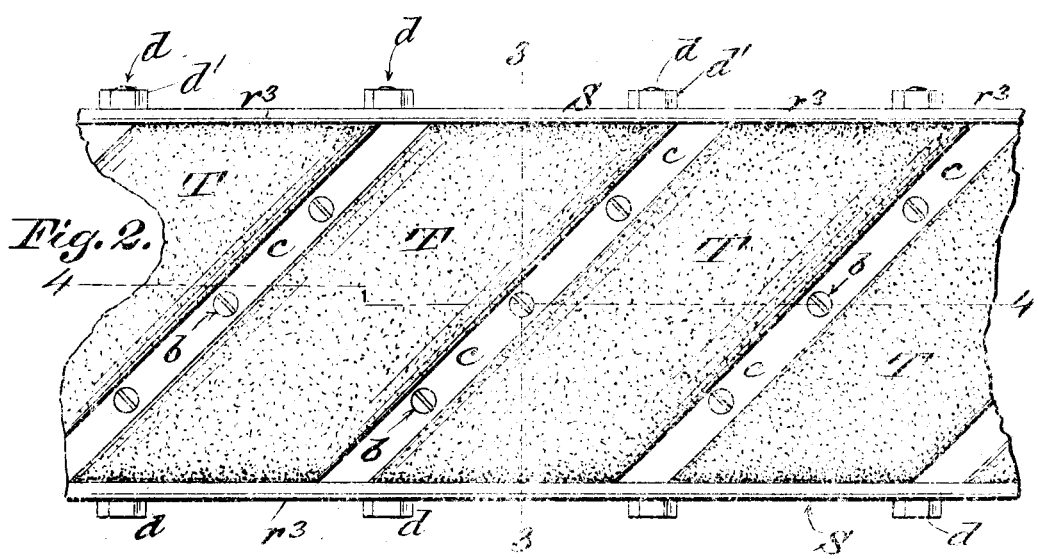
Figure 3:
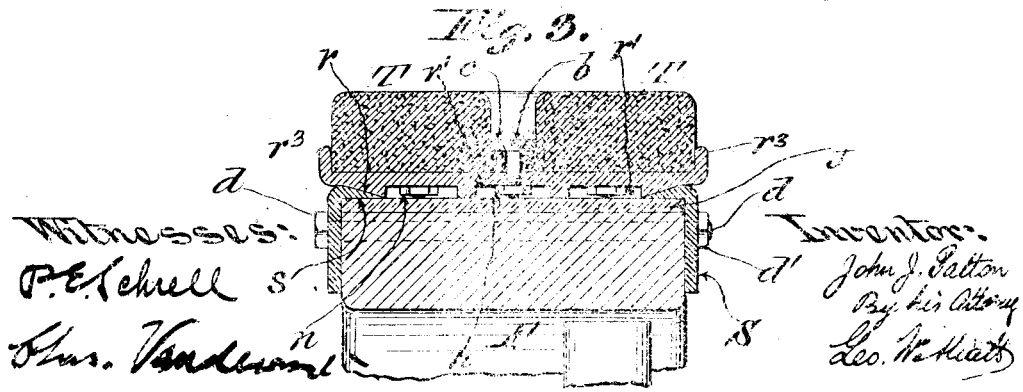

In the accompanying drawings, Figure 1, is a side elevation of a portion of a wheel embodying my invention; Fig. 2, is a plan or face view of a portion of the tire, shown for convenience of illustration as extended in a horizontal plane; Fig. 3, is a transverse section taken upon plane of line 3—3 Fig. 2; Fig. 4, is a longitudinal sectional view taken upon planes of line 4—4 Fig. 2, the curvature of the rim &c. being shown as in Fig. 1; Fig. 5, is a face view of a portion of the tire rim without the treads, cap plates, &c; Fig. 6, is a view of a portion of the underside of the tire rim; Fig. 7, is a detail view of the inner side of a portion of one of the annular wedge-flange side plates; Fig. 8, a section upon plane of line 8—8 Fig. 7; and Fig. 9, a transverse section of the tire rim taken upon plane of line 9—9 Fig. 5.

The felly F, of the wheel is provided with the usual permanent peripheral metallic band $f$. Over this fits my demountable tire rim R, on the face of which are positioned and secured elastic resilient tread sections T, T, preferably arranged diagonally as in Letters Patent No. 998,980, issued to me July 25th, 1911, although this is not essential, the gist of my present invention relating to the method of, and means for, detachably securing the tread rim R, to the felly. To this end the under side of the tire rim R, is formed with the inclined annular marginal bearing surfaces $r$, $r$, and with the recesses $r'$, $r'$, the latter to accommodate the nuts, $n$, $n$, which secure the bolts $b$, $b$, by which the cap plates $c$, $c$, are held in position,—said cap plates $c$, $c$, being used as heretofore to bear upon the flanges $t$, $t$, of the tread sections T, T, and bind the treads in position upon the face of the tire rim R. In this connection it is to be noted that the ribs $r^{21}$, $r^{21}$, on the face of the tire rim R, are provided mainly for the purpose of positioning the treads T, correctly and accurately on said rim, although they incidentally reinforce the bases of the treads T, against lateral strain and displacement, acting in conjunction with the caps $c$, $c$, and bolts $b$, $b$, as do also the side flanges $r^3$, $r^3$, of the tire rim.

By the provision of the recesses $r'$, $r'$, on the under side of the tire rim R, and the bolting of the treads T, T, directly and solely thereto, the tire rim R, is rendered independent of the felly in that the bolts $b$, $b$, do not pass through the latter, while the tire rim R, becomes an integral unit, applicable to and removable from the felly without the need of disturbing any of its component parts. The depth of marginal inclined bearing surfaces $r$, $r$, and of the ribs $r^2$, $r^2$, which constitute the side walls of the recesses $r'$, $r'$, is identical, so as to bear evenly and uniformly on the peripheral surface of the felly band $f$, as shown particularly in Fig. 3.

The tire rim R, is held in position upon the felly F, by the annular wedge-flanged side plates S, S, secured to the felly by bolts $d$, $d$, passing through the felly within the inner line of the felly band $f$, said bolts $d$, $d$, being locked in position by nuts $d'$, $d'$, in the usual way. These annular side plates S, S, are each formed with an inwardly protruding peripheral wedge-flange $s$, for engagement with the annular inclined marginal bearing surfaces $r$, $r$, on the under side of the tire rim, as shown in Fig. 3, particularly. Obviously when secured in position the annular wedge-flanged side plates S, S, will effectually support the tire rim R, and sustain it against lateral strain or displacement, while by the removal of a single side plate S, the tire rim may be conveniently removed and replaced without otherwise disturbing the parts.

By making the wedge-flanges s, s, integral with the annular side plates S, S, the number of separate parts is reduced and their manipulation facilitated, so that the operation of removing or applying a tire rim R, is rendered simple, and economy in time and labor attained. Each side plate S, is necessarily split transversely, as at s', Fig. 1, to facilitate the wedging operation, and hence the bolt holes $s^2$, are enlarged or elongated slightly to admit of the drawing together of the ends of the side plate.

What I claim as my invention and desire to secure by Letters Patent is,

1. The combination with a wheel felly, of a tire rim in a single integral element formed on its under side with inclined annular marginal bearing surfaces and intermediate recesses and upon its opposite face with diagonal ribs, treads, cap plates embedded therein, bolts securing said cap plates in position, and nuts on said bolts disposed in said recesses.

2. The combination with a wheel felly, of a tire rim in a single integral element formed on its under side with inclined annular marginal bearing surfaces and intermediate recesses, and upon its opposite face with diagonal ribs, treads, cap plates embedded therein, bolts passing through said ribs and securing said cap plates in position, and nuts on said bolts and disposed in said recesses, said ribs acting in conjunction with the treads and bolts for the purpose set forth.

JOHN J. PATTON.

Witnesses:
GEO. WM. MIATT,
LILLIA MIATT.